United States Patent
Pulla et al.

(10) Patent No.: US 8,578,368 B2
(45) Date of Patent: Nov. 5, 2013

(54) INJECTING A FILE FROM THE BIOS INTO AN OPERATING SYSTEM

(75) Inventors: Prasanth Pulla, Bangalore (IN);
Amitrajit Banerjee, Kolkata (IN);
Supriyo Roychoudhury, Nadia (IN);
Pranjal Goswami, Bangalore (IN)

(73) Assignee: Insyde Software Corporation, Taipei (TW)

( * ) Notice: Subject to any disclaimer, the term of this patent is extended or adjusted under 35 U.S.C. 154(b) by 828 days.

(21) Appl. No.: 12/774,553

(22) Filed: May 5, 2010

(65) Prior Publication Data

US 2011/0276793 A1 Nov. 10, 2011

(51) Int. Cl.
*G06F 9/445* (2006.01)

(52) U.S. Cl.
USPC .......................................... 717/174; 710/260

(58) Field of Classification Search
None
See application file for complete search history.

(56) References Cited

U.S. PATENT DOCUMENTS

| | | | |
|---|---|---|---|
| 6,405,309 B1 | 6/2002 | Cheng et al. | |
| 6,449,682 B1 * | 9/2002 | Toorians | 711/100 |
| 6,457,122 B1 | 9/2002 | Ramezani | |
| 6,564,318 B1 | 5/2003 | Gharda et al. | |
| 6,578,142 B1 * | 6/2003 | Anderson et al. | 713/2 |
| 7,120,794 B2 * | 10/2006 | Kelley et al. | 713/164 |
| 8,341,611 B2 * | 12/2012 | Munshi et al. | 717/149 |

* cited by examiner

*Primary Examiner* — Elias Mamo
(74) *Attorney, Agent, or Firm* — Muncy, Geissler, Olds & Lowe, PLLC

(57) ABSTRACT

Techniques for the BIOS to install a file into the runtime environment of an operating system of a computer. A system management interrupt (SMI) handler, resident within the BIOS, receives a first request. The SMI handler identifies an address in memory at which a first file is to be stored, and determines how to access a function provided by a kernel of the operating system. The SMI handler calls the function using the address as an argument to create a thread in the runtime environment of the operating system. Upon the SMI handler receiving a request from the thread, the SMI handler stores a second file in the memory of the runtime environment of the operating system. The thread may, but need not, store the second file to a file system provided by the operating system. In this way, the BIOS need not include a driver to the file system.

18 Claims, 3 Drawing Sheets

US 8,578,368 B2

INJECTING A FILE FROM THE BIOS INTO AN OPERATING SYSTEM

FIELD OF THE INVENTION

The present invention relates to approaches for the BIOS to install a file into the runtime environment of an operating system.

BACKGROUND OF THE INVENTION

Occasionally, it may be desirable or necessary for firmware or the basic input/output system ("BIOS") of a computer to install a file into the operating system of the computer. Such an installation may be performed to ensure that, for whatever reason, the current operating system executing on the computer includes the file.

Currently, when the BIOS installs a file into the operating system, the BIOS does so by writing the file to a particular location in the file system provided by the operating system using a driver associated with the file system. For example, NTFS (new technology file system) is the standard file system supported by the Microsoft Windows NT operating systems (and all later versions) from Microsoft Corporation of Redmond, Wash. For the BIOS to install a file into the NTFS file system, the BIOS would need to include an embedded NTFS driver. The NTFS driver would parse the NTFS file system and place the file on a hard-disk partition in the desired location.

Unfortunately, this approach has many disadvantages. Adding a file system driver into the BIOS increases the size of the BIOS. Also, maintaining a file system driver can be burdensome, as the format or specification of the file system driver may not be published or otherwise made available. Additionally, the above approach runs the risk of disabling the functionality of the operating system for the current session, because adding a file in this manner may result in a change in the checksums associated with data durably stored on disk, which may be interpreted by the operating system as a problem, and subsequently handled as such.

Another disadvantage is that it may be costly to license, from third party companies, the technology stack necessary for the BIOS to write to the file system provided by an operating system. Still yet another problem is that the file system provided by the operating system may be encrypted. While the operating system may store the necessary keys to access the file system, other computing entities outside of the operating system would not have access to those keys, and would thus be required to communicate with the operating system to write data to the file system, which may be burdensome and/or expensive as explained above.

SUMMARY OF THE INVENTION

Approaches for the basis input/output system (BIOS) of a computer to install a file into the runtime environment of an operating system are described herein. A system management interrupt (SMI) handler is a component that resides within the BIOS and is responsible for enabling a computer to operate in a particular operating mode called system management mode (SMM). In embodiments of the invention, a SMI handler is configured to perform additional functionality that enables a file to be introduced (or "injected") into the runtime environment of the operating system without the aid of a file system driver.

In an embodiment of the invention, when a computer undergoes a boot process, an advanced configuration and power interface (ACPI) routine, contained with the operating system being initialized (or "booted"), issues a request to the SMI handler, residing in the BIOS, to execute the SMI handler associated with this SMI. On a typical computer, this SMI handler would turn off BIOS power management features and leave the system power management policy decisions to the operating system. In an embodiment of the invention, the SMI handler in addition to its regular responsibility will perform additional functionality. For example, the SMI handler may identify an address in memory at which a first file (which may be an executable file or function) is to be stored, and may determine how to access a thread creation function provided by a kernel of the operating system. The thread creation function provided by the kernel creates a thread in the runtime environment of the operating system, and the first file may contain instructions so that, when the first file is passed as an argument to this function, the behavior of the thread created by the function may be configured.

The SMI handler calls the thread creation function using the address of the first file in memory as an argument to create a thread in the runtime environment of the operating system. The thread is configured to call the SMI handler when the operating system has finished booting up and the resources of the operating system are accessible by the thread. Upon the SMI handler receiving a request from the thread, the SMI handler stores a second file in the memory of the runtime environment of the operating system. The thread may, but need not, store the second file to a file system provided by the operating system. In this way, the BIOS need not include a driver to the file system to introduce the second file into the runtime environment of the operating system. Further, since the thread may use the functions provided by the kernel to durably store data on disk, the thread may be configured to durably store the second file to disk in a manner that would not cause a change in the checksums associated with data durably stored on disk, thereby avoiding the possibility that the operating system will interrupt the storage of the second file on disk as a problem.

The approaches described herein are not meant to describe all the embodiments of the invention, as other embodiments of the invention may differ in their operation compared to the illustrative approaches discussed in this section.

BRIEF DESCRIPTION OF THE DRAWINGS

Embodiments of the invention are illustrated by way of example, and not by way of limitation, in the figures of the accompanying drawings and in which like reference numerals refer to similar elements and in which.

DETAILED DESCRIPTION OF THE INVENTION

Approaches for the basis input/output system (BIOS) of a computer to install a file into the runtime environment of an operating system are described. In the following description, for the purposes of explanation, numerous specific details are set forth in order to provide a thorough understanding of the embodiments of the invention presented herein. It will be apparent, however, that the embodiments of the invention presented herein may be practiced without these specific details. In other instances, well-known structures and devices are shown in block diagram form in order to avoid unnecessarily obscuring the embodiments of the invention presented herein.

System Overview

Figure 1:
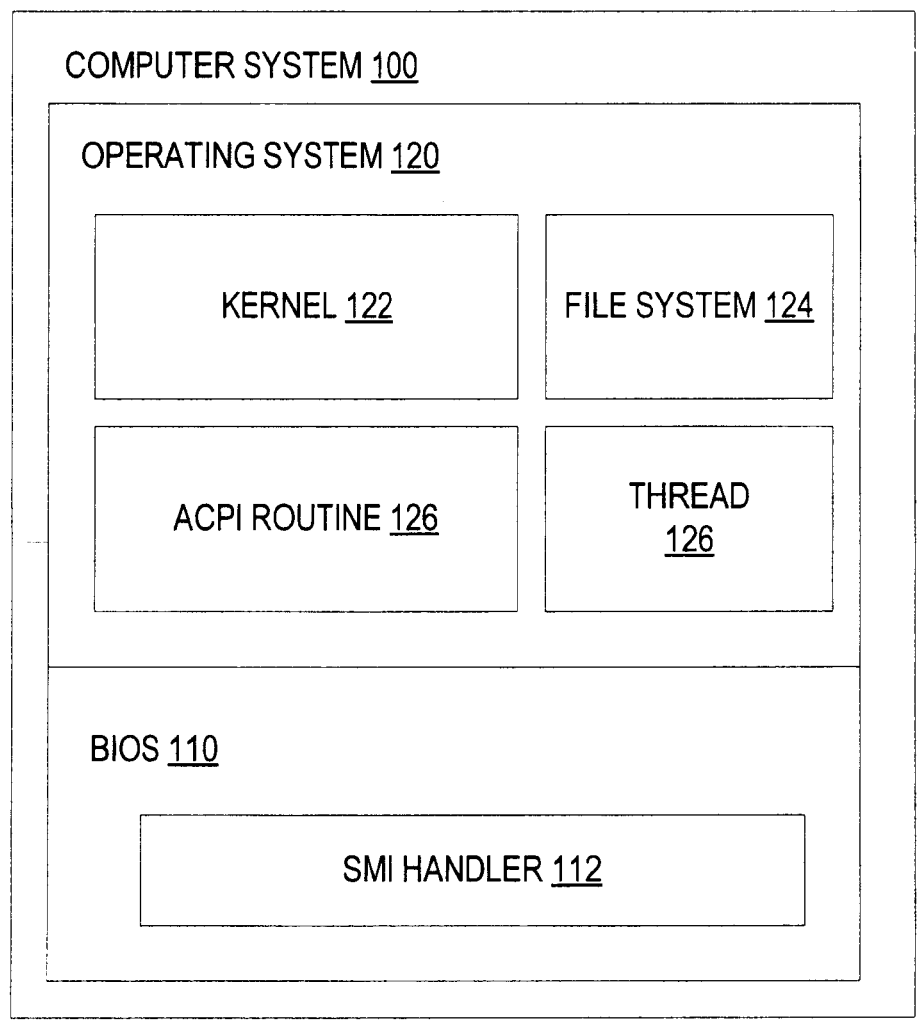
FIG. 1 is a block diagram of an illustrative computer system according to an embodiment of the invention.

FIG. 1 is a block diagram of illustrative computer system 100 according to an embodiment of the invention. Computer system 100 may correspond to any device which is capable of executing basic input/output system (BIOS) 110 and operating system 120. Non-limiting, illustrative examples of computer system 110 include a personal computer (PC), a laptop, a tablet computer, a server, a router, a personal digital assistant (PDA), a cell phone, and a game system (such as an Xbox available from Microsoft Corporation of Redmond, Wash. or a Playstation 3 available from Sony Corporation of Park Ridge, N.J.).

BIOS 110, as broadly used herein, refers to any basic input/output system (BIOS) that is designed to be the boot firmware for computer system 100 when computer system 100 is powered on. Operating system 120, as broadly used herein, refers to software that provides an interface between the BIOS 110 and application programs executing on computer system.

Operating system 120 includes kernel 122, which is the central component of operating system 120 that performs the core functionality of operating system 120. Kernel 122 may expose functions, which may be called by application processes or processes executing in BIOS 110, to enable the calling entities to perform actions and/or interact with resources within the runtime environment of operating system 120.

In an embodiment, operating system 120 includes file system 124. File system 124, as broadly used herein, refers to software for storing and organizing files and the data they contain. Typically, an operating system includes and supports a file system. For example, the Windows NT operating system (and all subsequent versions), from Microsoft Corporation, includes and supports the new technology file system (NTFS) file system.

The Advanced Configuration And Power Interface (ACPI)

Computer system 100 depicted in FIG. 1 contains two components related to the Advanced Configuration and Power Interface (ACPI) specification. The ACPI specification provides an open standard for unified operating system-centric device configuration and power management. The ACPI specification has a specification that was published Jun. 16, 2009, entitled "Revision 4.0," and was co-developed by the assignee of the present application. According to this specification, operating system 120 comprises ACPI routine 126 and BIOS 110 includes a SMI handler (although SMI handler 112 depicted in FIG. 1, as shall be explained herein, performs many inventive functions not contemplated by the ACPI specification).

The ACPI specification provides for a computer system to enter a system management mode (SMM), in which all normal execution (including the execution of operating system 120) is suspended, and a SMI handler is executed in a high-privilege mode. A computer system enters SMM by the SMI handler processing a system management interrupt (hereafter a "SMI interrupt"). By design, operating system 120 cannot override or disable a SMI interrupt.

ACPI routine 126 is responsible for generating an "enable ACPI SMI" call early in the boot process of computer system 100. Thus, when computer system undergoes a boot process, ACPI routine 126 makes an "enable SMI" call, which is received and processed by SMI handler 112. The "enable ACPI SMI" call is an indication to the BIOS that the operating system is capable of making and executing power management decisions and the BIOS should not interfere with its power management functions.

As shown in FIG. 1, SMI handler 112 is a component that processes SMI interrupts and handles operations of computer system 100 in SMM. Additionally, as shall be explained in further detail below, SMI handler 112 performs functionality that enables BIOS 110 to install a file into the runtime environment of operating system 120.

Injecting a File into the Runtime Environment of an Operating System

Figure 2:
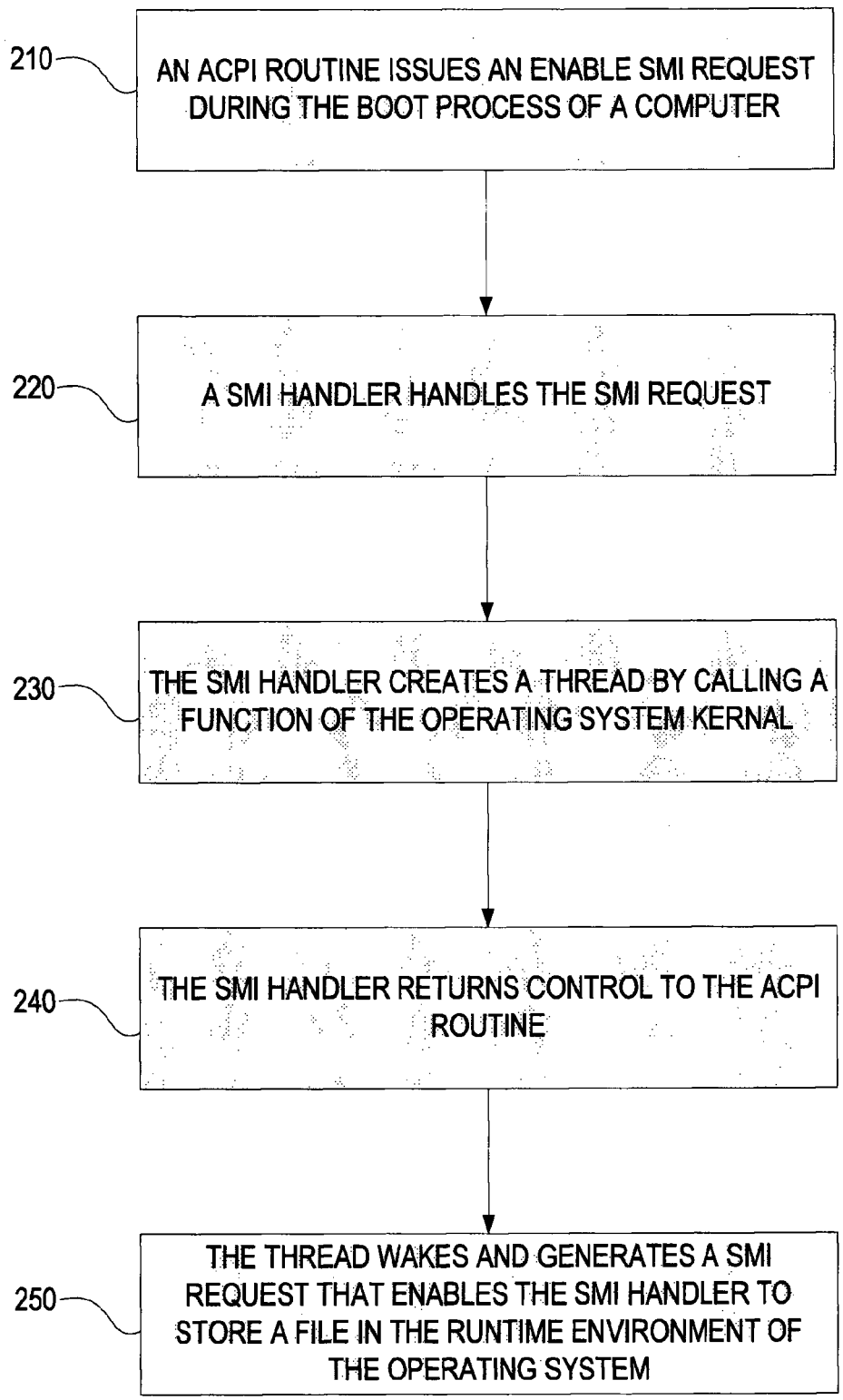
FIG. 2 is a flowchart illustrating the steps of injecting a file into the operating system performed by an embodiment of the invention.

FIG. 2 is a flowchart 200 illustrating the steps of injecting a file into the operating system performed by an embodiment of the invention. The steps of flowchart 200 involve a modified SMI handler, namely SMI handler 112, which is configured to operate in a manner that deviates from, and is not contemplated by, the ACPI specification.

In step 210, ACPI routine 126 in operating system 120 issues an "enable SMI" request to BIOS 110 during the boot process of computer system 120.

In step 220, the "enable SMI" request issued in step 210 is received and processed by SMI handler 112. In processing the "enable SMI" request, SMI handler 112 turns off the BIOS power management modules and delegates all power management policy decisions to the operating system.

In an embodiment, SMI handler 112 may determine the address of ACPI routine 126 in step 220. For example, in an embodiment of the invention implemented using an x86 architecture, the address of ACPI routine 126 is stored in a SMRAM CPU save state area.

After SMI handler 112 determines the address of ACPI routine 126, SMI handler 112 may scan the region of memory where the address of ACPI routine 126 is located to identify available space in memory to install a first file (referred to hereafter as a "thread handler function"). After identifying an appropriate available space in memory, SMI handler 112 may store the thread handler function in that location in memory. The thread handler function may be a function that instructs the behavior of an instantiated thread, as the thread handler function shall be used later in creating a thread in the runtime environment of operating system 120.

After storing the thread handler function in memory, SMI handler 112 may determine how to access functions provided by kernel 122. For example, in an embodiment of the invention implemented using an x86 architecture, SMI handler 112 may read a machine specific register (MSR register) to find an address of an Interrupt Gate Keeper function used by operating system 120. Once the address of the Interrupt Gate Keeper is found, SMI handler 112 may scan the memory above this address until the base of kernel 122 is found in memory for this session. SMI handler 112 may then uses the Portable Executable (PE) format information made available by the manufacturer of operating system 120 to map the export table of kernel 122. The PE format gives us the exact format of a binary image loaded into memory and the headers of such an executable contains a list of functions exported by it (called the Export Table or export address Table EAT).

In step 230, SMI handler 112 creates thread 126 by calling a function of kernel 122 using the address of the thread handler function in memory as an argument.

To illustrate, in an embodiment of the invention wherein operating system 120 is a Windows based operating system, SMI handler 112 may call the PsCreateSystemThread function of kernel 112 using the address of the thread handler function stored in memory as an argument. As a result, thread 126 is created in the runtime environment of operating system 120, and thread 126 is configured to operate in accordance with the thread handler function.

In step 240, SMI handler 112 returns control to ACPI routine 126, and computer system 100 resumes the boot process. In the meantime, thread 126, created in step 230, goes to sleep until all the subsystems of operating system 120 are up and operational. Once the subsystems of operating system 120 are up and operational (i.e., computer system 100 is done "booting up"), thread 126 wakes up. At this point, thread 126 will have access to all of the resources of operating system 100 and functions provided by kernel 122.

In step 250, thread 126 generates a software SMI interrupt, which is subsequently handled by SMI handler 112. Once the SMI handler 112 receives notice of this SMI interrupt, SMI handler will process this interrupt by storing one or more second files (hereafter collectively referred to as a "payload") into the runtime environment of operating system 120. The one or more second files may be executable files. Advantageously, as shown above, BIOS 110 need not contain a file system driver to inject the payload into the runtime environment of operating system 120.

Thread 126 may, but need not, write the payload, or a portion thereof, to a file system provided by operating system 120. Since thread 126 has access to all the functions provided by kernel 122, thread 126 may use a function, provided by kernel 122, to durably store the payload on disk. Further, because thread 126 is using kernel 122 to durably store data on disk, there is no possibility that the current session of operating system 120 will become corrupted, e.g., the checksums of data stored on disk will be updated correctly since kernel 122 is durably storing the payload.

The payload stored into the runtime environment of operating system 120 may be a sequence of executable code that is used for a variety of different purposes, including but not limited to: (a) ensuring that a desired set of software applications is installed on computer system 100 by installing, from a remote location, any number of software applications which should be installed on computer system 100 but are not, (b) monitoring the use of computer system 100 to enable targeted advertisements to be presented to the user of computer system 100, and (c) monitoring the configuration of one or more software applications installed on computer system 100 and subsequently reconfiguring one of the one or more installed software applications as required.

As previously indicated, the payload injected into the runtime environment of operating system 120 may be, but need not, be durably stored on disk. If the payload is not durably stored, then there will be no tell-tale evidence for forensics software to detect any additions or changes to files stored on disk. While software may be able to detect the payload stored in memory of computer system 100, such detection is a more remote possibility than detecting a changed or added file stored on disk. Thus, embodiments of the invention may be used to repeatedly introduce payloads into the runtime environment of operating system 120 in a manner that makes the presence of the payloads difficult to detect.

Implementing Mechanisms

Figure 3:
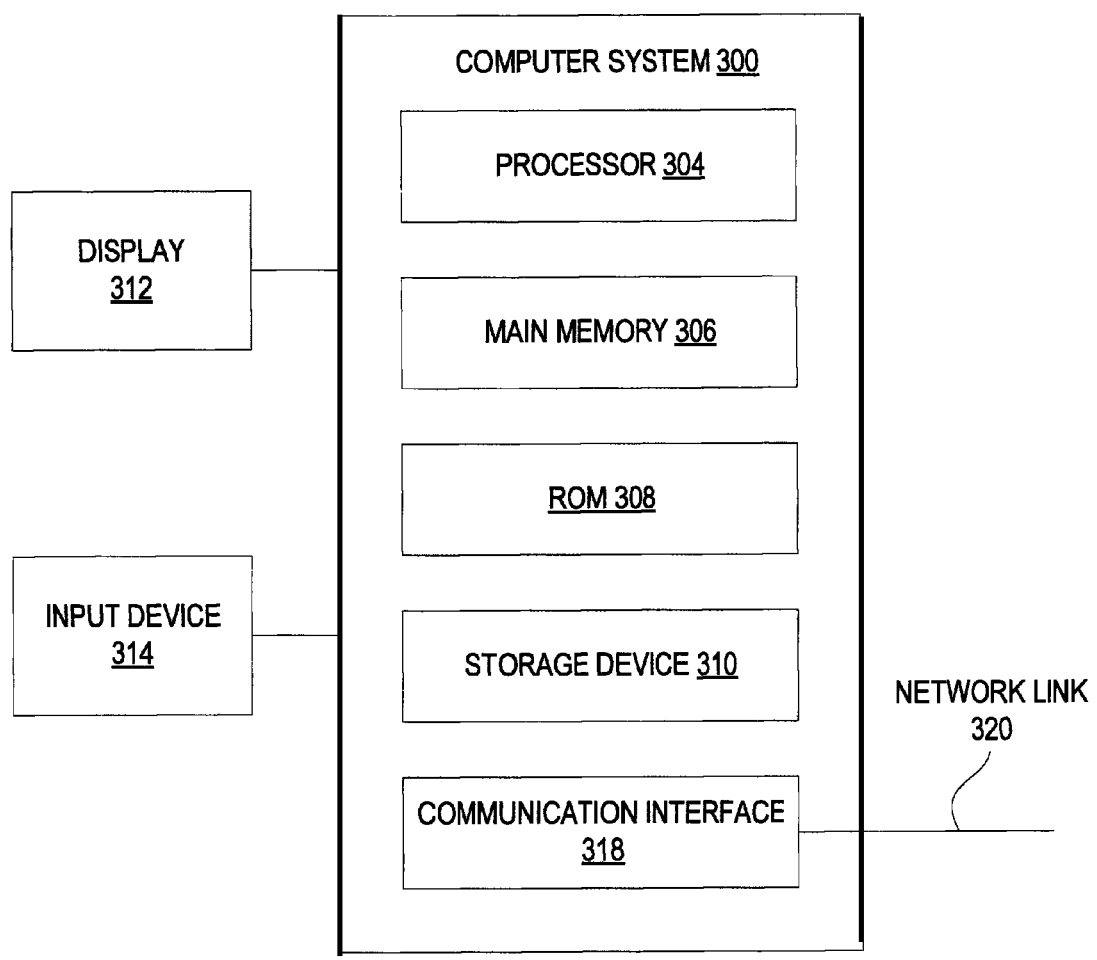
FIG. 3 is a block diagram that illustrates a computer system upon which an embodiment of the invention may be implemented.

FIG. 3 is a block diagram that illustrates a computer system 300 upon which an embodiment of the invention may be implemented. In an embodiment, computer system 300 includes processor 304, main memory 306, ROM 308, storage device 310, and communication interface 318. Computer system 300 includes at least one processor 304 for processing information. Computer system 300 also includes a main memory 306, such as a random access memory (RAM) or other dynamic storage device, for storing information and instructions to be executed by processor 304. Main memory 306 also may be used for storing temporary variables or other intermediate information during execution of instructions to be executed by processor 304. Computer system 300 further includes a read only memory (ROM) 308 or other static storage device for storing static information and instructions for processor 304. A storage device 310, such as a magnetic disk or optical disk, is provided for storing information and instructions.

Computer system 300 may be coupled to a display 312, such as a cathode ray tube (CRT), a LCD monitor, and a television set, for displaying information to a user. An input device 314, including alphanumeric and other keys, is coupled to computer system 300 for communicating information and command selections to processor 304. Other non-limiting, illustrative examples of input device 314 include a mouse, a trackball, or cursor direction keys for communicating direction information and command selections to processor 304 and for controlling cursor movement on display 312. While only one input device 314 is depicted in FIG. 3, embodiments of the invention may include any number of input devices 314 coupled to computer system 300.

Embodiments of the invention are related to the use of computer system 300 for implementing the techniques described herein. According to one embodiment of the invention, those techniques are performed by computer system 300 in response to processor 304 executing one or more sequences of one or more instructions contained in main memory 306. Such instructions may be read into main memory 306 from another machine-readable medium, such as storage device 310. Execution of the sequences of instructions contained in main memory 306 causes processor 304 to perform the process steps described herein. In alternative embodiments, hard-wired circuitry may be used in place of or in combination with software instructions to implement embodiments of the invention. Thus, embodiments of the invention are not limited to any specific combination of hardware circuitry and software.

The term "machine-readable storage medium" as used herein refers to any medium that participates in storing instructions which may be provided to processor 304 for execution. Such a medium may take many forms, including but not limited to, non-volatile media and volatile media. Non-volatile media includes, for example, optical or magnetic disks, such as storage device 310. Volatile media includes dynamic memory, such as main memory 306.

Non-limiting, illustrative examples of machine-readable media include, for example, a floppy disk, a flexible disk, hard disk, magnetic tape, or any other magnetic medium, a CD-ROM, any other optical medium, a RAM, a PROM, and EPROM, a FLASH-EPROM, any other memory chip or cartridge, or any other medium from which a computer can read.

Various forms of machine readable media may be involved in carrying one or more sequences of one or more instructions to processor 304 for execution. For example, the instructions may initially be carried on a magnetic disk of a remote computer. The remote computer can load the instructions into its dynamic memory and send the instructions over a network link 320 to computer system 300.

Communication interface 318 provides a two-way data communication coupling to a network link 320 that is connected to a local network. For example, communication interface 318 may be an integrated services digital network (ISDN) card or a modem to provide a data communication connection to a corresponding type of telephone line. As another example, communication interface 318 may be a local area network (LAN) card to provide a data communication connection to a compatible LAN. Wireless links may also be implemented. In any such implementation, communication interface 318 sends and receives electrical, electromagnetic or optical signals that carry digital data streams representing various types of information.

Network link 320 typically provides data communication through one or more networks to other data devices. For example, network link 320 may provide a connection through a local network to a host computer or to data equipment operated by an Internet Service Provider (ISP).

Computer system 300 can send messages and receive data, including program code, through the network(s), network link 320 and communication interface 318. For example, a server might transmit a requested code for an application program through the Internet, a local ISP, a local network, subsequently to communication interface 318. The received code may be executed by processor 304 as it is received, and/or stored in storage device 310, or other non-volatile storage for later execution.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A machine-readable storage medium storing one or more sequences of instructions for installing a file on a computer, which when executed, cause:
    upon a system management interrupt (SMI) handler, resident within a BIOS, receiving a first request, the SMI handler (a) identifying an address in memory at which a first file is to be stored, and (b) determining how to access a function provided by a kernel of an operating system resident on the computer;
    the SMI handler calling the function using the address as an argument thereof, wherein execution of the function creates a thread in a runtime environment of the operating system; and
    upon the SMI handler receiving a second request from the thread, the SMI handler storing a second file in memory of the runtime environment of the operating system,
    wherein the first request is issued by an advanced configuration and power interface (ACPI) routine in the operating system during the boot process of the computer.

2. The machine-readable storage medium of claim 1, wherein the second file is stored in memory of the runtime environment of the operation system without writing the second file to a file system provided by the operating system.

3. The machine-readable storage medium of claim 1, wherein the thread is configured to store the second file, or a portion thereof, to a file system provided by the operating system.

4. The machine-readable storage medium of claim 1, wherein the thread, once created, enters a sleep mode until the computer has finished the boot process.

5. The machine-readable storage medium of claim 1, wherein the SMI handler returns control to an advanced configuration and power interface (ACPI) routine after creating the thread.

6. The machine-readable storage medium of claim 1, wherein identifying the address in memory comprises determining an initial location in memory to begin scanning for available space based on the return address of the entity that issued the first request.

7. The machine-readable storage medium of claim 1, wherein determining how to access the function comprises:
    reading a machine specific register (MSR) register to determine an address of the interrupt gate keeper of the kernel; and
    using the address of the interrupt gate keeper to locate the export table of the kernel.

8. The machine-readable storage medium of claim 1, wherein the second request is a software-generated system management interrupt.

9. The machine-readable storage medium of claim 1, wherein the second file is an executable file, which when executed, performs functionality pertaining to recovery of resources of the computer, asset management of the computer, or providing customized content based on use of the computer.

10. A method for installing a file on a computer, comprising:
    upon a system management interrupt (SMI) handler, resident within a BIOS, receiving a first request, the SMI handler (a) identifying an address in memory at which a first file is to be stored, and (b) determining how to access a function provided by a kernel of an operating system resident on the computer;
    the SMI handler calling the function using the address as an argument thereof, wherein execution of the function creates a thread in a runtime environment of the operating system; and
    upon the SMI handler receiving a second request from the thread, the SMI handler storing a second file in memory of the runtime environment of the operating system,
    wherein the first request is issued by an advanced configuration and power interface (ACPI) routine in the operating system during the boot process of the computer.

11. The method of claim 10, wherein the second file is stored in memory of the runtime environment of the operation system without writing the second file to a file system provided by the operating system.

12. The method of claim 10, wherein the thread is configured to store the second file, or a portion thereof, to a file system provided by the operating system.

13. The method of claim 10, wherein the thread, once created, enters a sleep mode until the computer has finished the boot process.

14. The method of claim 10, wherein the SMI handler returns control to an advanced configuration and power interface (ACPI) routine after creating the thread.

15. The method of claim 10, wherein identifying the address in memory comprises determining an initial location in memory to begin scanning for available space based on the return address of the entity that issued the first request.

16. The method of claim 10, wherein determining how to access the function comprises:
- reading a machine specific register (MSR) register to determine an address of the interrupt gate keeper of the kernel; and
- using the address of the interrupt gate keeper to locate the export table of the kernel.

17. The method of claim 10, wherein the second request is a software-generated system management interrupt.

18. The method of claim 10, wherein the second file is an executable file, which when executed, performs functionality pertaining to recovery of resources of the computer, asset management of the computer, or providing customized content based on use of the computer.

* * * * *